(12) United States Patent
Van Os et al.

(10) Patent No.: US 10,883,706 B2
(45) Date of Patent: Jan. 5, 2021

(54) LIGHTING DEVICE AND METHOD FOR PRODUCING SUCH DEVICE

(71) Applicant: SIGNIFY HOLDING B.V., Eindhoven (NL)

(72) Inventors: Jacobus Petrus Johannes Van Os, Eindhoven (NL); Astrid Mody, Eindhoven (NL); Guofu Zhuo, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/108,487

(22) Filed: Aug. 22, 2018

(65) Prior Publication Data

US 2018/0356080 A1 Dec. 13, 2018

Related U.S. Application Data

(62) Division of application No. 14/598,686, filed on Jan. 16, 2015, now Pat. No. 10,072,828.

(30) Foreign Application Priority Data

Jan. 20, 2014 (EP) ..................... 14151721

(51) Int. Cl.
*F21V 21/14* (2006.01)
*F21K 9/90* (2016.01)
(Continued)

(52) U.S. Cl.
CPC ............ *F21V 21/14* (2013.01); *B29C 66/438* (2013.01); *F21K 9/90* (2013.01); *F21S 4/24* (2016.01); *B29K 2101/12* (2013.01); *B29L 2031/747* (2013.01); *F21Y 2115/10* (2016.08); *Y10T 29/49893* (2015.01)

(58) Field of Classification Search
CPC ............. B29L 2031/747; B29C 66/438; Y10T 29/49893; B29K 2101/12
See application file for complete search history.

(56) References Cited

U.S. PATENT DOCUMENTS

| 5,667,295 A | 9/1997 | Tsui |
| 5,818,998 A | 10/1998 | Harris et al. |
| 6,056,419 A | 5/2000 | March |

(Continued)

FOREIGN PATENT DOCUMENTS

| CN | 101669206 A | 3/2010 |
| JP | 2010146831 A | 7/2010 |

(Continued)

*Primary Examiner* — Michael N Orlando
*Assistant Examiner* — Abhishek A Patwardhan
(74) *Attorney, Agent, or Firm* — Akarsh P. Belagodu

(57) ABSTRACT

The present invention relates to a lighting device, which comprises a structure of interconnected sleeves and a light emitting arrangement arranged inside the sleeves. The structure forms a polygon mesh and light sources on the light emitting arrangement can be positioned by the structure so that the problem of glare can be reduced. The present invention also provides a sound-absorbing, flexible and collapsible structure which can be used in e.g. large scale architectural panels, horticulture and phototherapy devices. The lighting device can be produced by connecting the sleeves with thermoplastic material or by sewing.

6 Claims, 4 Drawing Sheets

(51) Int. Cl.
*F21S 4/24* (2016.01)
*B29C 65/00* (2006.01)
*F21Y 115/10* (2016.01)
*B29K 101/12* (2006.01)
*B29L 31/00* (2006.01)

(56) References Cited

U.S. PATENT DOCUMENTS

| | | | |
|---|---|---|---|
| 6,174,075 | B1 | 1/2001 | Fuwausa |
| 6,367,951 | B1 | 4/2002 | Kumada et al. |
| 8,288,940 | B2 | 10/2012 | Hehenberger |
| 8,361,582 | B2 * | 1/2013 | Jarvis .............. B29C 65/4815 428/121 |
| 8,393,755 | B2 | 3/2013 | Chien |
| 2002/0076948 | A1 | 6/2002 | Farrell et al. |
| 2005/0237741 | A1 | 10/2005 | Chang |
| 2006/0048495 | A1 | 3/2006 | Threlkeld et al. |
| 2006/0082987 | A1 * | 4/2006 | Dorsey .............. F21V 23/04 362/103 |
| 2006/0198587 | A1 * | 9/2006 | Lee .............. G02B 6/001 385/115 |
| 2007/0182666 | A1 | 8/2007 | Hochman et al. |
| 2008/0259633 | A1 | 10/2008 | Wang |
| 2008/0266842 | A1 | 10/2008 | Skidmore et al. |
| 2009/0018622 | A1 | 1/2009 | Asvadi et al. |
| 2010/0001664 | A1 * | 1/2010 | Shih .............. H05B 45/00 315/313 |
| 2012/0057346 | A1 | 3/2012 | Spanjaard |
| 2012/0155065 | A1 * | 6/2012 | Ubaghs .............. G09F 13/22 362/103 |
| 2012/0326634 | A1 | 12/2012 | Li |

FOREIGN PATENT DOCUMENTS

| | | |
|---|---|---|
| WO | WO2004094896 A2 | 11/2004 |
| WO | WO2009011853 A1 | 1/2009 |
| WO | WO2011114263 A2 | 9/2011 |
| WO | WO2013016646 A2 | 1/2012 |
| WO | WO2013084108 A1 | 6/2013 |

* cited by examiner

LIGHTING DEVICE AND METHOD FOR PRODUCING SUCH DEVICE

FIELD OF THE INVENTION

The present invention relates to the technical field of lighting devices and specifically relates to a lighting device with embedded lighting sources, (such as LED's) arranged in a grid.

The lighting device can be used in the design of architectural elements, large scale lighting devices or flexible textile garments (such as phototherapy devices).

BACKGROUND OF THE INVENTION

Lighting devices are used in many applications, such as functional lighting devices, luminous architectural and decorative panels.

An example of a light-emitting textile-based architectural element is disclosed in WO-2011/114263. The architectural element has a layered structure comprising a substrate textile, a diffusive sheet and a cover textile. A plurality of embedded light-sources is arranged in-between the layers such that the light is integrated into the structure. The diffusive layer distributes the light inside the structure and also reduces unwanted 'glare' effects. The layered structure in WO-2011/114263 is mounted on a rigid frame so that the layers are placed in the right distance from each other and so that a flat surface is achieved.

However, there is a need to provide different shapes of luminous articles and provide lighting devices without the need for mechanical frames. Additionally, there is a need to provide large scale architectural panels with a reduced glare effect without the use of diffusive sheets.

SUMMARY OF THE INVENTION

In view of the above, it is an object of the present invention to provide an alternative lighting device and a method for producing a lighting device.

A lighting device, comprising a first and a second sleeve, a first set of at least two interconnecting seams connecting the sleeves to each other, wherein the interconnecting seams are arranged in-between the first and the second sleeves and extend in a transverse direction in relation to a longitudinal direction of the sleeves, and a light emitting arrangement having a plurality of light sources, which is located inside at least one of the sleeves.

The present invention is based on the realization that by arranging light sources in a layered structure with a specific geometry, the glare effect from the light sources can be reduced. Consequently, the direction and angle of the light can be arranged such that the light is directed into the structure itself. Hence, the glare effect can be reduced without the use of diffusive layers. By excluding the diffusive layer, less amount of light is absorbed by the structure. Moreover, the structure of the lighting device does not need a frame to support the layers, and therefore provides a cost-efficient design of for large scale illumination articles and a garment articles.

According to an exemplary embodiment, the lighting device further comprises a third sleeve and a second set of interconnecting seams arranged in-between the second and the third sleeves, wherein the first set of interconnecting seams is offset with a distance in relation to the second set of interconnecting seams along the longitudinal direction of the sleeves. In each set of interconnecting seams, the individual seams are arranged at a seam distance from each other. The set of interconnecting seams is offset such that a first seam in a second set is offset in relation to a first seam in a first set. The offset distance being in the range of 25% to 75% of the distance between the interconnecting seams in the same set. The offset seams make it easier to achieve a polygon mesh with sufficiently large openings. An advantage is that with more open meshes in the lighting device the air circulation around the light sources is improved. This can be especially beneficial for large area lighting devices when used in artificial lighting for horticulture applications, or in large area phototherapy textiles. Another advantage is that the acoustical absorption characteristics of the device are improved by the multi-layered structure with cavities. Acoustical properties are often important for large type architectural panels.

According to an exemplary embodiment, the sleeves are flat with a closed circumference. The flat structure results in larger openings in the polygon mesh and enhances the circulation of light and air. It also creates a smaller structure when the lighting device is in a collapsed state.

According to an exemplary embodiment, the sleeves are provided with apertures at the location of the light sources. An advantage is that more light can be emitted through the sleeves.

According to an exemplary embodiment at least two interconnecting seams are arranged in perpendicular to the longitudinal direction of the sleeves. By arranging the interconnecting seams in perpendicular, the openings in the structure have straight walls so that a spectator can see through the architectural panel. Additionally, the circulation of light and sound through the panel is increased.

According to an exemplary embodiment the interconnecting seams are arranged at an angle different from 90 degrees in relation to the longitudinal direction of the sleeves. By arranging the interconnecting seams at an angle, the openings in the structure are skewed such that a spectator cannot see through the architectural panel.

According to an exemplary embodiment, the sleeves are flexible. An advantage is that the structure can folded together and easily transported if needed.

According to an exemplary embodiment, the sleeves are rigid. An advantage is that the structure can be at least partially self-supporting.

According to an exemplary embodiment, the interconnecting seams comprise a thermoplastic material. Thermoplastic material provides a fast way of joining a sleeve.

According to an exemplary embodiment, the interconnecting seams comprise a thermoplastic yarn with a heat-resistant core. An advantage of using thermoplastic yarns, is the fact that the connection will be straight, small and strong, based on a selected thermoplastic and heat resistant material combination. Another advantage is that by adjusting the amount and type of thermoplastic material in the thermoplastic, it is possible to create a robust interconnect. This can especially be an advantage in water-tight constructions to be used in horticulture environments.

According to an exemplary embodiment, the interconnecting seams comprise a thread which is connecting the sleeves to each other in stitched seams. A stitched seam may provide an additional advantage such as an increased tensile strength.

According to an exemplary embodiment, the sleeves are formed by sheets, which are joined together in longitudinal seams, and wherein the longitudinal seams are chosen from the group of stitched seams, glued seams and thermoplastic seams. The sheet structure provides a flat cross section of the sleeves so that large openings in the polygon mesh can be achieved.

According to an exemplary embodiment the sleeves comprise a textile material. A textile material is flexible and can easily be provided in different textures, patterns and colors which can cooperate with the light sources in order to achieve a desired type of light in terms of e.g. light intensity, colors, or patterns.

According to an exemplary embodiment the light emitting arrangement is a flexible carrier on which a plurality of light sources is arranged. An advantage is that the flexible carrier takes the shape of the sleeves and follows the angles in the structure.

According to an exemplary embodiment, the light sources are low energy light sources, such as LEDs or variable LEDs. An advantage is that less heat is generated inside the sleeves.

According to a second aspect of the present invention in accordance with the first aspect thereof, it relates to a method of producing a lighting device, the method comprises the steps of:

A) arranging a first and a second flexible sheet on top of each other, such that they form a first pair of sheets,
B) arranging a third and a fourth sheet on top of each other, such that they form a second pair of sheets,
C) placing the first pair of sheets onto the second pair of sheets and connecting the first pair of sheets to the second pair of sheets,
D) joining longitudinal edges in each pairs of sheets, such that each pair of sheets form a sleeve, and
E) inserting a light-emitting arrangement into at least one of the sleeves.

Production of this lighting device can take place in flat format, finally in use the band is bend so that it corresponds with the shape of the lighting device.

According to an exemplary embodiment the step of connecting the first and the second pair of sheets, can be performed by:

placing lines of thermoplastic material between the first and the second pair of sheets, and applying heat to the thermoplastic material. The fusible yarns will enable an easy, automated and flexible production of lighting device.

According to an exemplary embodiment, the steps included in the method are performed in the listed order from step A to step E.

BRIEF DESCRIPTION OF THE DRAWINGS

The invention will now be described with reference to the appended drawings, which by way of example illustrate embodiments of the present invention and in which.

DETAILED DESCRIPTION OF THE EMBODIMENTS

In the following description, a lighting device according to at least one exemplary embodiment of the present invention is described in the context of a large scale architectural panel. It should be noted that this by no means limits the scope of the present invention, which is equally applicable to other types of industrial applications, such as lighting devices for horticulture, combined shading and lighting devices and phototherapy blankets.

Figure 1:
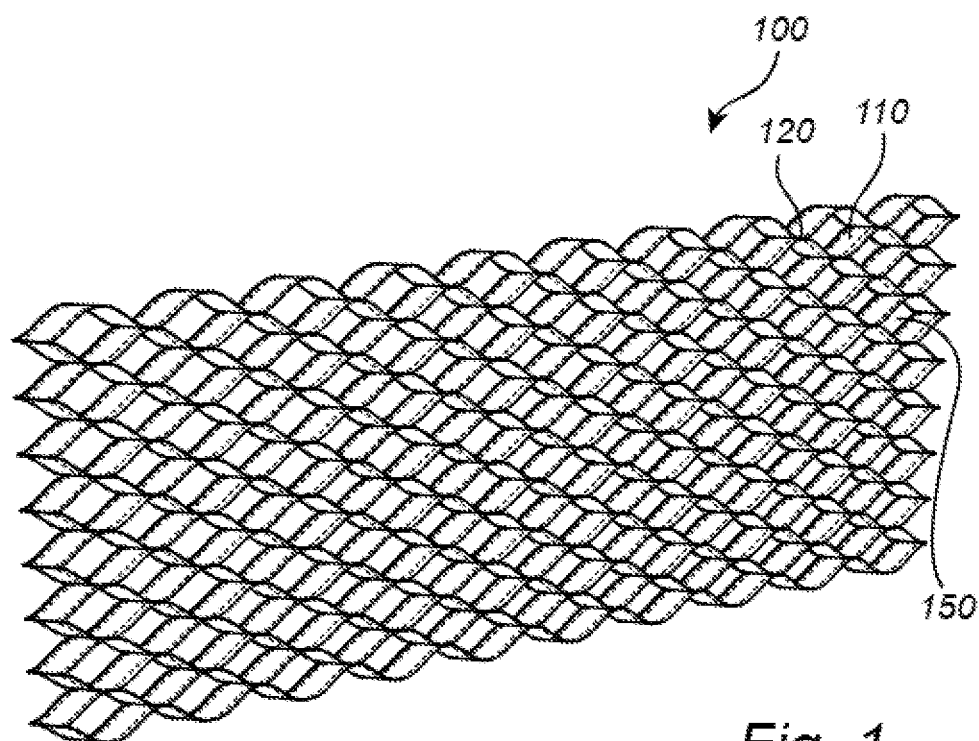
FIG. 1 is a schematic view of a lighting device according to an embodiment of the present invention.

As schematically illustrated in FIG. 1, a lighting device 100 according to the present invention can be produced in the shape of an architectural panel. Now referring to FIG. 2a, which shows that a large scale lighting device 100 can be produced in an efficient and flexible way by replicating a polygon structure of elongated sleeves 110 connected by interconnecting seams 120. In use, the light sources 116 (e.g. LEDs) will emit light through the sleeves 110 and light up openings 150 defined in the polygon structure of the interconnected sleeves 110.

The lighting device 100 can be provided with a flexible and collapsible structure by using a flexible material in the sleeves 110. For instance, the sleeves 110 can comprise a textile material in the shape of woven or non-woven sheets 11. The textile material may comprise natural or synthetic fibers, metal or plastic. However, the sheet material is not limited to textiles; foils and plastic sheets can also be used, as long as they are at least partially light transparent.

The lighting device 100 can be placed in various positions and locations, for instance, it can be used as a room/space divider in a vertical position. A vertical position of the lighting device 100 is defined as a position in which the openings 150 of the lighting device are arranged in a horizontal direction. It may also be placed in a horizontal position, by e.g. suspending the device in a ceiling. Consequently, a horizontal position of the lighting device 100 is defined as a position in which the openings 150 of the lighting device are arranged in a vertical direction. If the structure is flexible, cords may be used for suspending the lighting device 100 in a mounted and extended position.

Alternatively, some or all the sleeves 110 can be provided with rigid sections, such that the structure is partly or completely self-sufficient. The rigidity can be achieved by the material in the flexible sheets 11. Additionally the lighting device 100 may be post-treated with material in e.g. liquid form that after curing is rigidified.

Figure 2A:
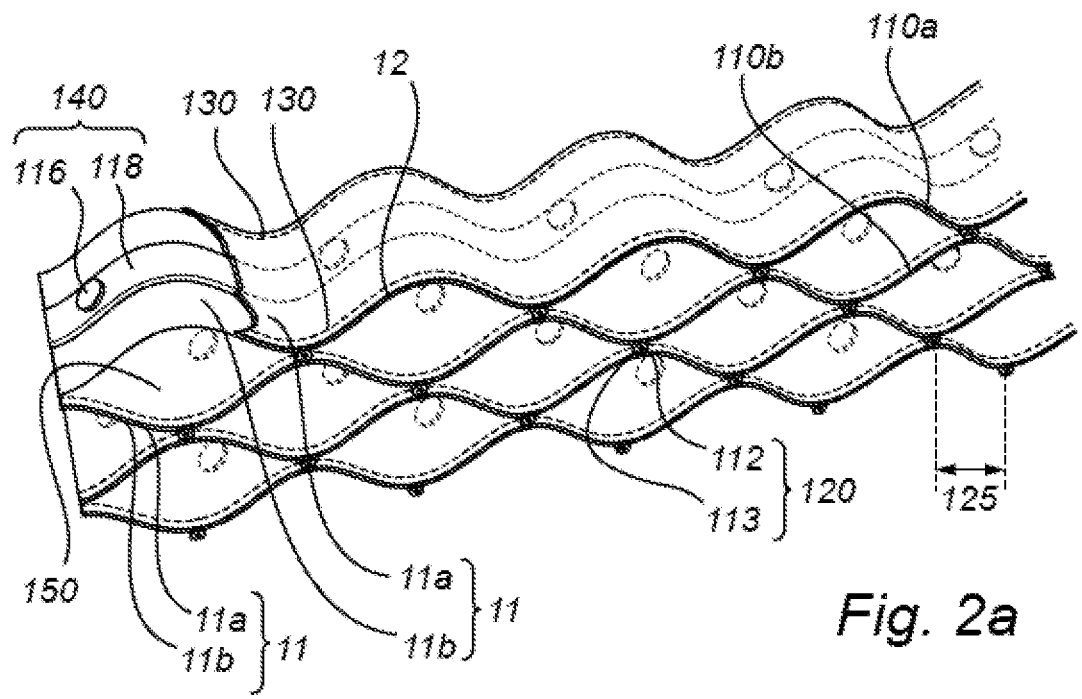
FIG. 2a is a schematic perspective view, partly cut-away, showing the structure of the lighting device in FIG. 1.

The embodiment in FIG. 2a, schematically illustrates the structure of the lighting device 100 in an embodiment which comprises four interconnected sleeves 110. The walls of a first sleeve 110a consist of a first 11a and a second elongated and flexible sheet 11b, arranged together as a first pair and with the edges 12 joined by two longitudinal seams 130, such that they form a first sleeve 110a. Alternatively, a sleeve 110 can be produced from a single sheet 11 that has been folded and closed in one longitudinal seam 130.

Figure 2B:
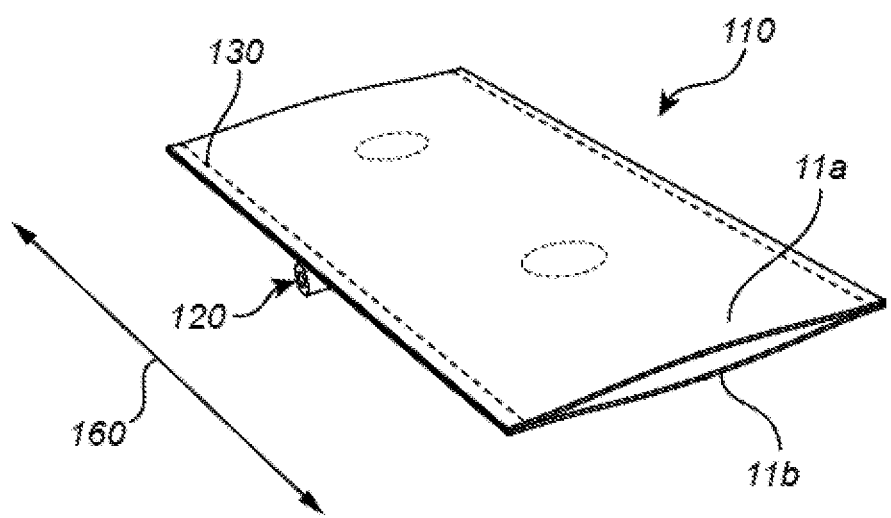
FIG. 2b is a schematic perspective view of an elongated sleeve according to the present invention.

As illustrated in FIG. 2b, by joining the sheets 11 in longitudinal seams 130, the sleeve 110 has a closed circumference along its longitudinal extension 160. Additionally, the when two elongated sheets 11 are joined in two longitudinal seams 130, the hollow cross section of the sleeves 110 can be arranged such that the sleeves 110 are flat.

A plurality of sleeves 110 can be formed in the same way as the first sleeve 110. In order to create a meshed structure, the sleeves 110 are stacked, one on top of the other, and connected to the adjacent sleeves 110 in interconnecting seams 120 arranged in-between the sleeves 110. In the illustrated example, the interconnecting seams 120 consist of a thermoplastic yarn and connect a sheet 11*b* of the first sleeve 110*a* to a sheet 11*a* of the second sleeve 110*b*. Only two sheets 11 are connected by the interconnecting seams 120 at each connection, whereby the sleeves 110 are hollow inside with a free space for introducing a light emitting arrangement 140. All sleeves 110 can be connected one to the adjacent other in a similar way. The thermoplastic yarn comprises a heat resistant core 112 surrounded by a thermoplastic layer 113. The heat resistant core 113 can for instance comprise polyester (PES material) with a thermoplastic covering such as thermoplastic polyurethane (TPU), but can also be selected from any types of materials which are commonly known to provide heat resistant characteristics and thermoplastic characteristics. The interconnecting seams 120 between each sleeve 110 are offset in relation to each other with a distance 125. The offset interconnecting seams 120 creates a polygon meshed structure with the interconnected sleeves 110.

The sleeves 110 form a closed structure adapted to house the light emitting arrangement 140 with the plurality of light sources 116. Alternatively, the sleeves 110 may be provided with apertures in the locations of the light sources 116, such that more light is emitted through the structure.

The light emitting arrangement 140 may be a flat flexible band on which LEDs are arranged. The flexible shape can be bent to follow the shapes defined by the interior of the sleeves 110.

The light sources 116 may be of LED type. For instance, the LEDs can be of a RGB type (red, green, and blue), which can produce both white light as well as color changing capabilities if they are pixel controlled. The light emitting arrangement 140 can be made from conventional electronics like flexible printed circuit boards. If the light emitting arrangement 140 is a flat flexible band is populated with RGB LEDs including data control, the band can be introduced in a flat format and thereafter bent to correspond with the desired structure of the lighting device 100. The light sources 116 are positioned inside the sleeves, between the interconnecting seams 120.

Figure 3A:
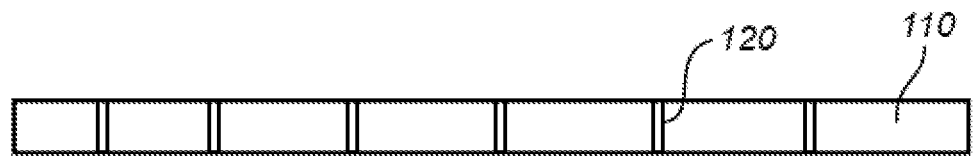
FIGS. 3a and 3b are different embodiments of the position of the interconnecting seams according to the present invention.
Figure 3B:
Figure 3C:
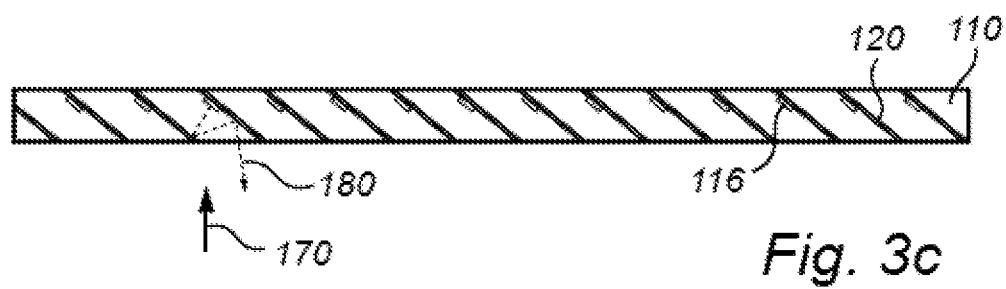
FIG. 3c illustrates the position of the light sources in relation to the interconnecting seams according to an embodiment of the present invention.

The structure of the lighting device 100 can be modified by changing the position and angle of the interconnecting seams 120. As illustrated in FIG. 3*a*, the interconnecting seams 120 may be arranged in perpendicular in relation to the longitudinal direction on the sleeves 160. As illustrated in FIGS. 3*b* and 3*c*, the interconnecting seams 120 may be arranged at an angle α in relation to the longitudinal direction 150 on the sleeves 110. By arranging the interconnecting seams 120 at an angle α in relation to the longitudinal direction 160 on the sleeves 110, the openings 150 in the structure are skewed such that a spectator cannot see through the lighting device 100. The skewed openings 150 result in a polygon structure in which the light effects from the light sources 116 (e.g. RGB LEDs) can be enhanced. The direct sight 170 into the light sources 116 is limited by the skewed openings 150, and the outgoing light 180 is diffused over larger area. This can be an advantage in the application of the lighting device 100 as an architectural panel for separating spaces in e.g. a room.

Additionally, by providing sleeves 110 with a reflective material, the direction of the light from the light sources 116 can be reflected inside the sleeves 110 to create a lighting effect. Moreover, this kind of construction with skewed openings 150 make it interesting for architectural design where it can block transparency under specific angles and allow transparency for other angles. For example this can be achieved by selecting a light transparent material in one sheet 11 and a reflective material in the other sheet 11.

Figure 4:
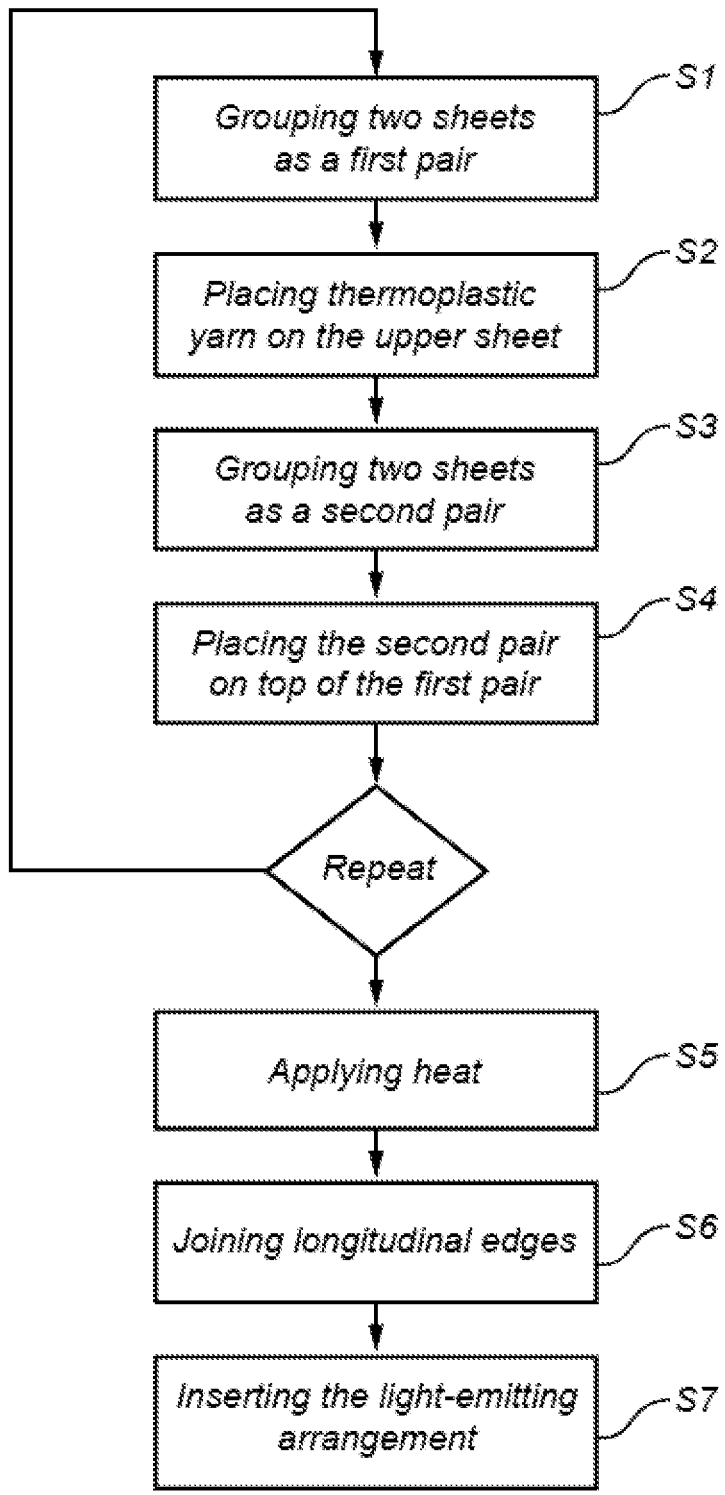
FIG. 4 is a schematic view of manufacturing step in a hot press.

As schematically illustrated in FIG. 4, the structure of the lighting device 100 can be produced by stacking and joining sheets 11. After the structure is produced, the light emitting arrangement 140 can be inserted into the structure. A method for producing a lighting device may include the steps of:

In a first step S1, grouping a first 11*a* and a second flexible sheet 11*b* on top of each other, such that they form a first pair of sheets.

In a second step S2, placing lines of thermoplastic yarn 120 on top of the upper sheet 11*a* in the first pair. This thermoplastic yarn 120 can be placed by a wire laying automat. Alternatively, the thermoplastic yarn 120 can be placed in a manual operation.

a third step S3, grouping a first 11*a* and a second flexible sheet 11*b* on top of each other, such that they form a second pair of sheets.

In a fourth step S4, placing the second pair on top of the first pair.

In a following step, the first and second steps can be repeated, such that a desired size of a stack 200 is created.

In a fifth step S5, applying heat to the stack 200 such that the pair of sheets 11 are connected to each other.

In a sixth step S6, joining longitudinal edges 12 of the sheets 11 in each pair of sheets, such that each pair of sheets forms a sleeve 110. The edges 12 of each pair of sheets 11 can be joined by gluing the edges 12 together or by stitching. Alternatively, the longitudinal edges 12 may be closed by arranging lines of thermoplastic material in-between the sheets 11 included in each pair in a joint operation with the third step. By performing a joint operation, both the longitudinal 130 and the interconnecting seams 120 can be placed in the same production step.

In a seventh step S7, inserting a light-emitting arrangement 140 into at least one of the sleeves 110.

Optionally, the method comprises a in an eight step S8, cutting the stack 200 before or after the step of applying heat to the stack 200.

Optionally, the method comprises a in a ninth step S8, controlling the interconnections between the sheets 11 before slicing it. This step provides a quality control of the structure.

Figure 5:
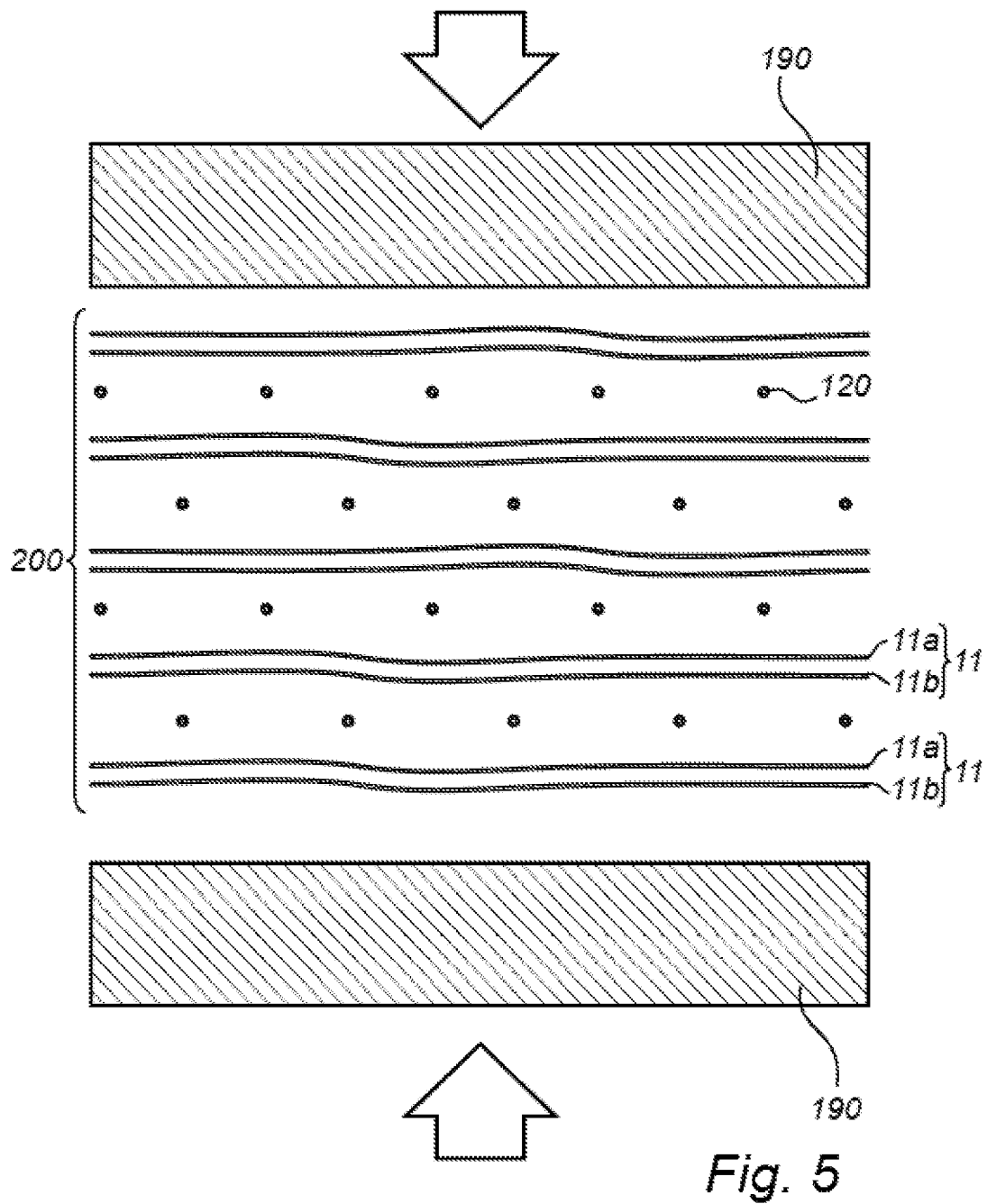
FIG. 5 is a flow chart illustrating the steps of an exemplary manufacturing method.

As schematically illustrated in FIG. 5, the production method may include the use of a hot press that activates the thermoplastic material. FIG. 5 shows a stack of sheets 200 arranged in-between the plates 190 of a hot press machine. The temperature of the stack inside the press should preferably achieve 120 to 150 degrees C., for approximately 20 seconds under a pressure of 6 bar, such that the sheets 11 are bonded to each other.

After the bonding process is finished, the stack 200 can be sliced in a direction essentially transverse with the interconnecting seams 120 such that the stack 200 is cut into several thinner stacks of interconnected elongated sleeves 110. Depending on the desired illumination pattern, all or some of the sleeves 110 can be filled with light emitting strips 118. The process of inserting the light emitting strips 118 can be done manually or with help of tools which can pull the flexible strips 118 through the sleeves 110.

The connection between the light emitting arrangement 140 and the sleeve structure is reversible. Bringing back the sleeves 110 to the original format of flat strips, makes it easy to retrieve the light emitting arrangement 140 (e.g. LED strips) out when product comes at end-of-life or at repairs and makes it a sustainable design as well.

Additionally, the lighting device may also be adapted for more specific purposes, such as the use as a phototherapy blanket, for e.g. treating Jaundice. In particular, the present invention can give the light emitting surface a more comfortable surface.

A still further example includes horticulture applications, where the plants need a homogeneous light and uniform light intensity. This requires a constant distance between the light source and the plant or vegetable, a water resistant structure. Additionally, the structure has to allow sufficient air/$CO_2$ concentration around the plant. A flexible lighting system according to the present invention would fulfil this requirement by designing the sleeves from water-tight structure of e.g. plastic sheets. Moreover, the size of the openings in the structure can be adapted, such that the plants can grow inside the openings and receive a well distributed light.

The skilled person will realize that the present invention by no means is limited to the described exemplary embodiments.

It is also possible to use alternative methods for producing a lighting device according to the present invention. For instance, the method can involve sewing and can comprise the following steps:

A) arranging a first set of two sheets on top of each other, one sheet belonging to a first sleeve and the other belonging to a second sleeve,
B) sewing the first set of two sheets together along the extension of the interconnecting seams,
C) arranging a second set of two sheets on top of each other, one sheet belonging to a second sleeve and the other belonging to a third sleeve,
D) stacking the first and the second set of sheets in a direction essentially transverse in relation to the extension of the interconnecting seams, and such that the interconnecting seams are offset,
E) joining longitudinal edges in of the sheets, such that a sheet in a first set of sheets forms a sleeve with a sheet in a second set of sheets, and
F) inserting a light-emitting arrangement into at least one of the sleeves.

Optionally, the method comprises a step of cutting the sheets or stack of sheets in a direction essentially transverse to the extension of the interconnecting seams. The step is performed before the longitudinal edges of the sheets are joined.

The mere fact that certain measures are recited in mutually different dependent claims does not indicate that a combination of these measures cannot be used to advantage. Moreover, the expression "comprising" does not exclude other elements or steps. Other non-limiting expressions include that "a" or "an" does not exclude a plurality and that a single unit may fulfil the functions of several means. Any reference signs in the claims should not be construed as limiting the scope. Finally, while the invention has been illustrated in detail in the drawings and in the foregoing description, such illustration and description is considered to be illustrative or exemplary and not restrictive; the invention is not limited to the disclosed embodiments.

The invention claimed is:

1. A method of producing a lighting device, comprising the steps of:
   A) arranging a first and a second flexible sheet on top of each other, such that they form a first pair of sheets,
   B) arranging a third and a fourth sheet on top of each other, such that they form a second pair of sheets,
   C) placing the first pair of sheets onto the second pair of sheets and connecting the first pair of sheets to the second pair of sheets,
   D) joining longitudinal edges in each pairs of sheets, such that each pair of sheets form a sleeve, and such that the first pair of sheets, the second pair of sheets and the joint longitudinal edges together define an opening, and further that the longitudinal edges are joined such that the opening is skewed thereby preventing direct sight through the opening, and
   E) inserting a light-emitting arrangement into the opening.

2. The method according to claim 1, wherein the step of connecting the first and the second pair of sheets, is performed by placing lines of thermoplastic material between the first and the second pair of sheets, and applying heat to the thermoplastic material.

3. The method according to claim 1, wherein the step of joining the longitudinal edges in each pairs of sheets is selected from the group of stitching, gluing and heat treating a thermoplastic material.

4. The method according to claim 1, wherein after the step of connecting the first pair of sheets to the second pair of sheets, the method further comprises a step of:
   cutting the sheets in a transverse direction in relation to a plurality of connecting seams that connect the first pair of sheets to the second pair of sheets, such that the sheets form at least two elongated stacks of sheets.

5. The method according to claim 1, wherein the steps included in the method are performed in the listed order from step (A) to step (E).

6. The method according to claim 1, wherein the step of joining the longitudinal edges in each pairs of sheets is performed by heat treating a thermoplastic material.

* * * * *